United States Patent [19]
Bergstrom et al.

[11] Patent Number: 5,395,908
[45] Date of Patent: Mar. 7, 1995

[54] METHOD OF PREPARING IN SITU REINFORCED SILICONE ELASTOMER

[75] Inventors: Debora F. Bergstrom; Gary T. Burns; Patricia A. Giwa-Agbomeirele, all of Midland, Mich.

[73] Assignee: Dow Corning Corporation, Midland, Mich.

[21] Appl. No.: 262,702

[22] Filed: Jun. 20, 1994

[51] Int. Cl.6 ............................................... C08G 77/08
[52] U.S. Cl. ........................................ 528/18; 528/37
[58] Field of Search .................................... 528/18, 37

[56] References Cited

U.S. PATENT DOCUMENTS 3,528,941 9/1970 Murphy ................................ 528/18
4,341,842 7/1982 Lampe .

OTHER PUBLICATIONS

Mark et al., Makromol. Chem. Rapid Commun. 3:681-685 (1982).
Jaing et al., Colloid & Polymer Sci. 262:758-760 (1984).
Mark et al., Macromolecules 17:2613-2616 (1984).
Tang et al., Polymer Engineering & Science 25:29-31 (1985).
Ning et al., Polymer Bulletin 13:155-161 (1985).
Mark et al., Polymer Bulletin 14:325-329 (1985).
Sur et al., Makromol. Chem. 187:2861-2866 (1986).

*Primary Examiner*—Melvyn I. Marquis
*Attorney, Agent, or Firm*—William F. Boley

[57] ABSTRACT

A method for preparing in situ reinforced silicone elastomers and the compositions prepared by the method. The method comprises forming a mixture comprising a diorganosiloxane polymer having reactive end-terminal functionality, a stoichiometric excess of a reactive siloxane selected from a group consisting of triorganosilyl endblocked reactive siloxanes and reactive cyclosiloxanes, and a tin salt catalyst and contacting the mixture with water to effect curing. The resulting silicone elastomers are in situ reinforced to provide high strength.

18 Claims, No Drawings

METHOD OF PREPARING IN SITU REINFORCED SILICONE ELASTOMER

BACKGROUND OF INVENTION

The present invention is a method for preparing in situ reinforced silicone elastomers and the compositions prepared by the method. The method comprises forming a mixture comprising a diorganosiloxane polymer having reactive end-terminal functionality, a stoichiometric excess of a reactive siloxane selected from a group consisting of triorganosilyl endblocked reactive siloxanes and reactive cyclosiloxanes, and a tin salt catalyst and contacting the mixture with water to effect curing. The resulting silicone elastomers are in situ reinforced to provide high strength.

It is known that crosslinked diorganopolysiloxanes must be reinforced with suitable fillers to obtain silicone elastomers with desirable mechanical properties such as high tensile strength and elongation. A typical filler used for this purpose is pyrogenic silica. The manufacture of pyrogenic silica for this purpose is an energy intensive process resulting in costs that are reflected in the cost of the resultant silicone elastomer. In addition, mixing of silica particles into viscous polymers, such as for the preparation of high-consistency elastomers, requires significant energy and time and gives products with properties which are highly dependent on the mixing process.

In the present method the reinforcing filler is generated in situ, thus avoiding the expense of externally forming the reinforcing filler and the expense, time, and variability associated with mixing the reinforcing filler into the diorganopolysiloxanes.

Mark et al., Makromol. Chem. Rapid Commun. 3:681–685 (1982), describe a two-step process where silanol end-blocked polydimethylsiloxane (PDMS) or vinyl end-blocked PDMS are end-linked to form elastomeric matrices. The end-linked elastomeric matrices are then swollen with tetraethoxysilane (TEOS) and the absorbed TEOS hydrolyzed in place by immersion of the sample into glacial acetic acid.

Jaing et al., Colloid & Polymer Sci. 262:758–760 (1984), used the same two-step process as described by Mark et al., supra, but rather than hydrolyzing the TEOS in acetic acid used a constant relative humidity chamber to cure the TEOS in situ.

Subsequently, Mark et al., Macromolecules 17:2613–2616 (1984), described a one-step or simultaneous curing and in situ filling process. In the process, silanol end-blocked PDMS, TEOS, and tin catalyst were mixed at various TEOS to PDMS ratios and cured using atmospheric moisture. The tin catalyst used were dibutyltin diacetate and stannous(II) ethylhexanoate.

Tang et al., Polymer Engineering and Science 25:29–31 (1985), described a one-step simultaneous curing and filling method where a bimodal mixture of silanol end-terminated PDMS including one long and one short chain polymer fraction was combined with stannous(II) ethylhexanoate and various amounts of TEOS and cured using atmospheric moisture.

Ning et al., Polymer Bulletin 13:155–161 (1985), reported using trifunctional silanes to form resinous reinforcing phases in a two-step process. In this work, a vinyl-terminated PDMS was tetrafunctionally end-linked and then swollen with various amounts of TEOS, ethyltriethoxysilane, or diethyldiethoxysilane and combinations of these alkoxysilanes. Precipitation of the alkoxysilanes to form the silica or silicate resin was done by immersion of test samples into an aqueous solution of ethyl amine.

Mark et al., Polymer Bulletin 14:325–329 (1985), report using trifunctional silanes as a precursor to form trifunctional silicate resins in a simultaneous one-step curing and filling process. Mark et al. report mixing silanol end-terminated PDMS and stannous(II) ethylhexanoate with either vinyltriethoxysilane, methyltriethoxysilane, or phenyltriethoxysilane at various alkoxysilane to PDMS ratios and curing samples under atmospheric conditions.

Sur et al., Makromol. Chem. 187:2861–2866 (1986), report a two-step process where silanol-terminated PDMS is end-linked and then swollen with either tetramethoxysilane, TEOS, tetrapropoxysilane, or tetrabutoxysilane. The samples were cured by immersion in aqueous solutions containing one of a variety of amine catalysts.

Lampe, U.S. Pat. No. 4,341,842, issued Jul. 27, 1982, reports a silicone rubber composition having (A) 100 parts of a silanol end-stopped diorganopolysiloxane polymer with a viscosity varying from 100 to 500,000 centipoise at 25° C., (B) from 0.1 to 15 parts by weight of an alkyl silicate or partial hydrolysis product of the silicate, and (C) from 0.01 to 5 parts by weight of a metal salt of a carboxylic acid, where the composition is cured at room temperature to a silicone elastomer.

SUMMARY OF INVENTION

The present invention is a method for preparing in situ reinforced silicone elastomers and the compositions prepared by the method. The method comprises forming a mixture comprising a diorganosiloxane polymer having reactive end-terminal functionality, a stoichiometric excess of a reactive siloxane selected from a group consisting of triorganosilyl endblocked reactive siloxanes and reactive cyclosiloxanes, and a tin salt catalyst and contacting the mixture with water to effect curing. The resulting silicone elastomers are in situ reinforced to provide high strength.

DESCRIPTION OF INVENTION

The present invention is a method for preparing an in situ reinforced silicone elastomer and silicone elastomers prepared by the method. The method comprises:

(A) forming a mixture comprising a diorganosiloxane polymer described by formula $$Q_{3-a}R_aSi(OSiR_2)_xOSiR_aQ_{3-a}, \qquad (1)$$

a stoichiometric excess of a reactive siloxane selected from a group consisting of triorganosilyl endblocked reactive siloxanes described by formula $$R_3Si(OSiQR)_zOSiR_3 \qquad (2)$$

and reactive cyclosiloxanes described by formula $$(OSiQR)_y, \qquad (3)$$

and a tin salt catalyst and (B) contacting the mixture with water to effect curing of the mixture to form an in situ reinforced silicone elastomer; where each R is independently selected from a group consisting of alkyls comprising one to six carbon atoms, alkenyls comprising two to six carbon atoms, and aryls; each Q is independently selected from a group consisting of hydroxy, acyloxys, oximos described by formula —ON=CR$^1_2$ where each R$^1$ is an independently selected alkyl comprising one to 12 carbon atoms, alkoxys comprising one to six carbon atoms, and substituted alkoxys comprising one to six carbon atoms; a=0 to 2; x=0 to 1000; z=3 to 500; and y=3 to 10.

The method of forming the mixture comprising the diorganosiloxane polymer, the reactive siloxane, and a tin salt catalyst is not critical to the present process and can be any such processes known to those skilled in the art. For example, the mixture can be formed in a standard mixer or blender. This mixture can then be, for example, extruded, molded; or dip-coated, wiped, or sprayed on to a substrate.

The present method requires a diorganosiloxane polymer as described by formula (1). The diorganosiloxane polymer contains substituent R, where each R is independently selected from a group consisting of alkyls comprising one to six carbon atoms, alkenyls comprising two to six carbon atoms, and aryls. The substituent R can be, for example, methyl, ethyl, propyl, tertbutyl, hexyl, 1,1,1-trifluoropropyl, perfluoropropyl, phenyl, xylyl, and naphthyl. Preferred is where in formula (1) R is methyl.

The diorganosiloxane polymer also contains on each end one, two, or three substituents Q, where each Q is a reactive functionality independently selected from a group consisting of hydroxy, acyloxys, oximos described by formula —ON=CR$^1_2$ where each R$^1$ is an independently selected alkyl comprising one to 12 carbon atoms, alkoxys comprising one to six carbon atoms, and substituted alkoxys comprising one to six carbon atoms. The substituent Q can be, for example, hydroxy, methoxy, ethoxy, butoxy, ethylmethyloximo, dimethyoximo, and 1,1,1-trifluoropropoxy. Preferred is when Q is hydroxy. More preferred is when Q is hydroxy and each a=2.

The diorganosiloxane polymer is mixed with a stoichiometric excess of a reactive siloxane described by formula (2) or formula (3) or their partial hydrolyzate. The reactive siloxane serves both as a crosslinker for the diorganosiloxane polymer and as a source material for the in situ formation of filler within the matrices of the crosslinked diorganosiloxane polymer.

The reactive siloxane has substituent Q, where Q is as previously described. It is preferred that Q be an alkoxy comprising one to six carbon atoms. More preferred is when Q is methoxy. It is preferred that less than about 10 percent of the reactive functionalities of the reactive siloxanes be hydroxy.

The reactive siloxanes have substituents R, where R is as previously described. Preferred is when R is methyl.

When the reactive siloxane is a triorganosilyl endblocked reactive siloxane, it can have z number of repeating units described by formula —(OSiQR)$_z$—, where Q and R are as previously described. The value z can equal three to 500. Preferred is when z is a value within a range of about ten to 100. The preferred triorganosilyl endblocked reactive siloxane is one where R is methyl, Q is methoxy, and z is a value within a range of about ten to 100.

When the reactive siloxane is a reactive cyclosiloxane, it can have y number of repeating units as described by formula (OSiQR)$_y$, where Q and R are as previously described. The value y can be within a range of three to 10. The preferred reactive cyclosiloxane is one where y is within a range of about four to six. The most preferred reactive cyclosiloxane is one where R is methyl, Q is methoxy, and y is a value within a range of about four to six.

By "stoichiometric excess" it is meant that the number of Q substituents provided to the method by addition of the reactive siloxane is greater than the number of Q substituents provided to the method by the diorganosiloxane polymer. It is preferred that the reactive siloxane be added to the method at a concentration where the amount of Q provided to the process by the reactive siloxane is about five to ten times stoichiometric excess in relation to the Q added to the process by the diorganosiloxane polymer.

The reactive siloxanes useful in the present method can be prepared, for example, by reacting a corresponding organohydrogensiloxane polymer with an alcohol in the presence of a supported palladium catalyst. The supported palladium catalyst can be, for example, palladium supported on carbon. By this process, the silicon-bonded hydrogen atoms of the organohydrogensiloxane polymer are replaced by a reactive functionality.

The mixture comprising the diorganosiloxane polymer and the reactive siloxane also comprises a tin salt catalyst. The tin salt catalyst can be any such catalyst which facilitates the crosslinking of the diorganopolysiloxane polymer by the reactive siloxane, facilitates the condensing of the reactive siloxane to form an in situ filler, or facilitates both. The tin salt catalyst can be, for example, dibutyltin dilaurate, dibutyltin dibenzoate, dibutyltin diacetate, or stannous(II) ethylhexanoate. A preferred tin salt catalyst is dibutyltin dilaurate.

The concentration of tin salt catalyst in the present method can be within a range of about 0.005 to 10 weight percent of the combined weight of the catalyst, the diorganosiloxane polymer, and the reactive siloxane added to the method. Preferred is when the concentration of tin salt catalyst is within a range of about 0.01 to 2 weight percent of the combined weight as described.

The mixture comprising the diorganosiloxane, the reactive siloxane, and the tin salt catalyst is contacted with water to effect curing of the mixture to an in situ reinforced silicone elastomer. The present method requires the presence of water to effect crosslinking of the diorganosiloxane polymers by the reactive siloxane and to effect in situ filler formation by stoichiometric excess reactive siloxane. The water can be provided to the method in liquid or vapor form.

For example, the mixture comprising the diorganosiloxane polymer, the reactive siloxane, and the tin salt catalyst can be cured in an environment having a relative humidity within a range of about 20 percent to about 100 percent. Preferred is when the mixture is cured in an environment having a relative humidity within a range of about 30 percent to 70 percent.

The silicone elastomers prepared by the present method cure readily at room temperature. However, any temperature within a range of greater than about 0° C. to 100° C. is suitable for conducting the present method. Preferred is when the method is conducted at a temperature within a range of about 20° C. to 30° C.

The silicon elastomers prepared by the present method are unique elastomers having high tensile strength, typically above about 500 psi. This high tensile strength is achieved without the addition of externally generated reinforcing fillers. Therefore, also claimed herein are silicone elastomer compositions prepared by the present method.

The following examples are provided to illustrate the present method and compositions prepared thereby. These examples are not intended to limit the scope of the claims herein.

EXAMPLE 1

The diorganosiloxane polymer comprised a mixture of silanol end-terminated polydimethylsiloxane polymers including by weight 25% polymer of about Mn=2,700, 25% polymer of about Mn=38,000, and 50% polymer of about Mn=58,000. Into this diorganosiloxane polymer mixture was mixed about 13.2 weight percent of methylmethoxy cyclic siloxanes having four to six degrees of polymerization i.e. {Me(-MeO)SiO}$_{4-6}$. About 0.2 weight percent of dibutyltin dilaurate was stirred into the siloxane mixture and the mixture was poured into a chase. The chase containing the mixture was placed in a relative humidity chamber at about 50% relative humidity. The samples were cured for a minimum of seven days. The samples were tested for tensile strength and elongation according to ASTM Standard D12-87. The Shore (A) durometer was determined by standard techniques. The sample was determined to have a tensile of 539 psi, elongation of 166 percent, and a Shore (A) durometer of 37.

EXAMPLE 2

An elastomer was prepared as described in Example 1, except in this example 0.08 weight percent tin octoate as was used as a catalyst. The cured sample was tested by the methods described in Example 1. The sample had a tensile strength of 762 psi, elongation of 154%, and a Shore (A) durometer of 46.

EXAMPLE 3

An elastomer was prepared as described in Example 1, except in this example the diorganosiloxane polymer used was a linear polymer of formula Me$_3$SiO{Me(MeO) SiO}$_{100}$SiMe$_3$. The cured sample was tested by the methods described in Example 1. The sample had a tensile strength of 525 psi, elongation of 240 percent, and a Shore (A) durometer of 30.

EXAMPLE 4

An elastomer sample was prepared as described in Example 1, except the diorganosiloxane polymer used was a linear polymer of formula Me$_3$SiO{Me(MeO)SiO}$_{100}$SiMe$_3$ and the catalyst was 0.08 weight percent tin octoate. The cured sample was tested by the methods described in Example 1. The sample had a tensile of 625, elongation of 191%, and a Shore (A) durometer of 39.

We claim:

1. A method for preparing an in situ reinforced silicone elastomer, the method comprising:
    (A) forming a mixture comprising a diorganosiloxane polymer described by formula $Q_{3-a}R_aSi(OSiR_2)_xOSiR_aQ_{3-a}$, a stoichiometric excess of a reactive siloxane selected from a group consisting of triorganosilyl endblocked reactive siloxanes described by formula $R_3Si(OSiQR)_zOSiR_3$ and reactive cyclosiloxanes described by formula $(OSiQR)_y$, and a tin salt catalyst and
    (B) contacting the mixture with water to effect curing of the mixture to form an in situ reinforced silicone elastomer;
    where each R is independently selected from a group consisting of alkyls comprising one to six carbon atoms, alkenyls comprising two to six carbon atoms, and aryls; each Q is independently selected from a group consisting of hydroxy, acyloxys, oximos described by formula —ON=CR$^1_2$ where each R$^1$ is an independently selected alkyl comprising one to 12 carbon atoms, alkoxys comprising one to six carbon atoms, and substituted alkoxy comprising one to six carbon atoms; a=0 to 2, x=0 to 1000; z=3 to 500, and y=3 to 10.

2. A method according to claim 1, where each R substituent of the diorganosiloxane polymer is methyl and each substituent Q of the diorganosiloxane polymer is hydroxy.

3. A method according to claim 1, where each substituent Q of the diorganosiloxane polymer is hydroxy and each a=2.

4. A method according to claim 1, where each substituent Q of the reactive siloxane is an alkoxy comprising one to six carbon atoms.

5. A method according to claim 1, where each substituent Q of the reactive siloxane is methoxy.

6. A method according to claim 1, where z is a value within a range of about ten to 100.

7. A method according to claim 1, where R is methyl, each Q substituent of the diorganosiloxane polymer is hydroxy, each Q substituent of the reactive siloxane is methoxy, and z is a value within a range of about ten to 100.

8. A method according to claim 1, where R is methyl, each Q substituent of the diorganosiloxane polymer is hydroxy, each Q substituent of the reactive siloxane is methoxy, and y is a value within a range of about four to six.

9. A method according to claim 1, where the amount of substituent Q provided to the process by the reactive siloxane is about five to ten times stoichiometric excess in relation to the substituent Q provided to the process by the diorganosiloxane polymer.

10. A method according to claim 1, where the tin salt catalyst is selected from a group consisting of dibutyltin dilaurate, dibutyltin dibenzoate, dibutyltin diacetate, and stannous(II) ethylhexanoate.

11. A method according to claim 1, where the tin salt catalyst is dibutyltin dilaurate.

12. A method according to claim 1, where the concentration of the tin salt catalyst is within a range of about 0.005 to 10 weight percent of the combined weight of the catalyst, the diorganosiloxane polymer, and the reactive siloxane.

13. A method according to claim 1, where the concentration of the tin salt catalyst is within a range of about 0.01 to 2 weight percent of the combined weight of the catalyst, the diorganosiloxane polymer, and the reactive siloxane.

14. A method according to claim 1, where curing of the mixture is effected in a moist environment having about 30 percent to 70 percent relative humidity.

15. A method according to claim 1, where the method is conducted at a temperature within a range of about 20° C. to 30° C.

16. An in situ reinforced silicone elastomer prepared by the method of claim 1.

17. An in situ reinforced silicon elastomer prepared by the method of claim 7.

18. An in situ reinforced silicon elastomer prepared by the method of claim 8.

* * * * *